Nov. 22, 1955  F. TREMBLEY  2,724,587
SUSPENSION DEVICE OF VARIABLE FLEXIBILITY FOR VEHICLES
Filed Jan. 24, 1950  7 Sheets-Sheet 1

INVENTOR:
FERNAND TREMBLEY
By: Young, Emery & Thompson
Attys.

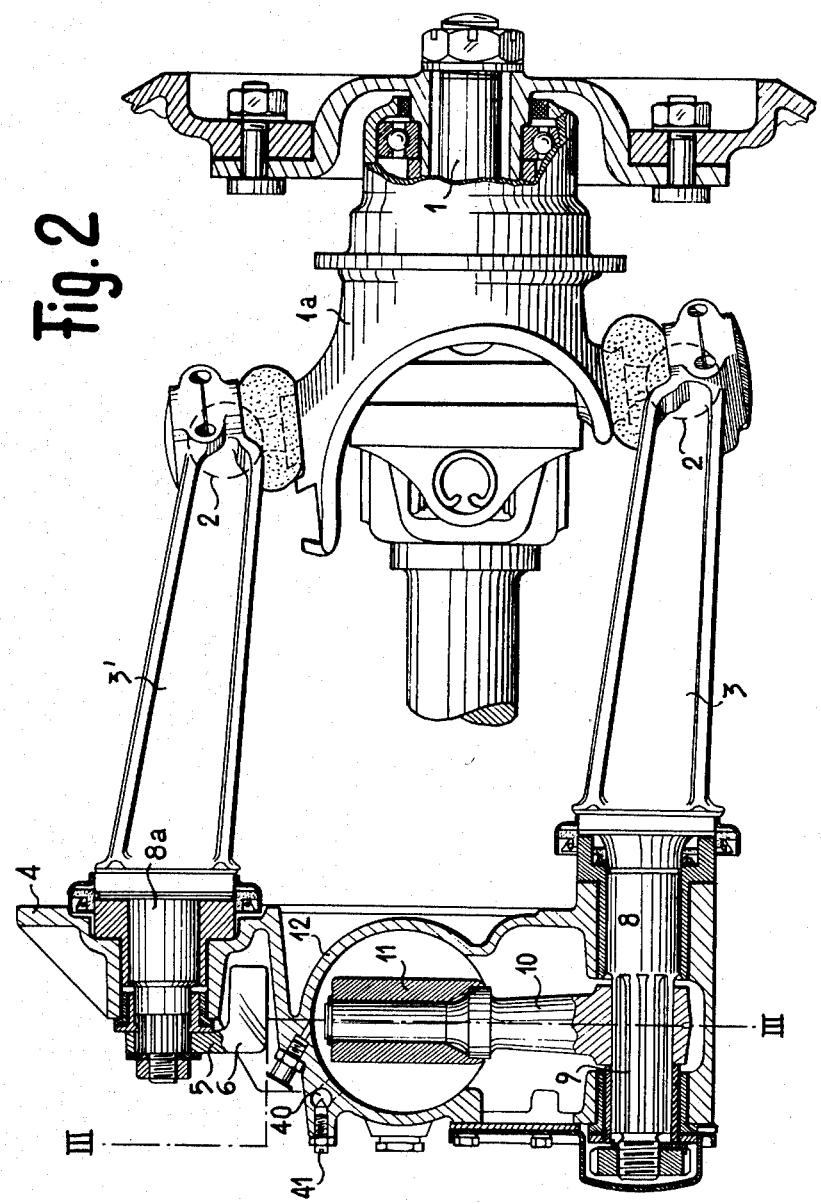

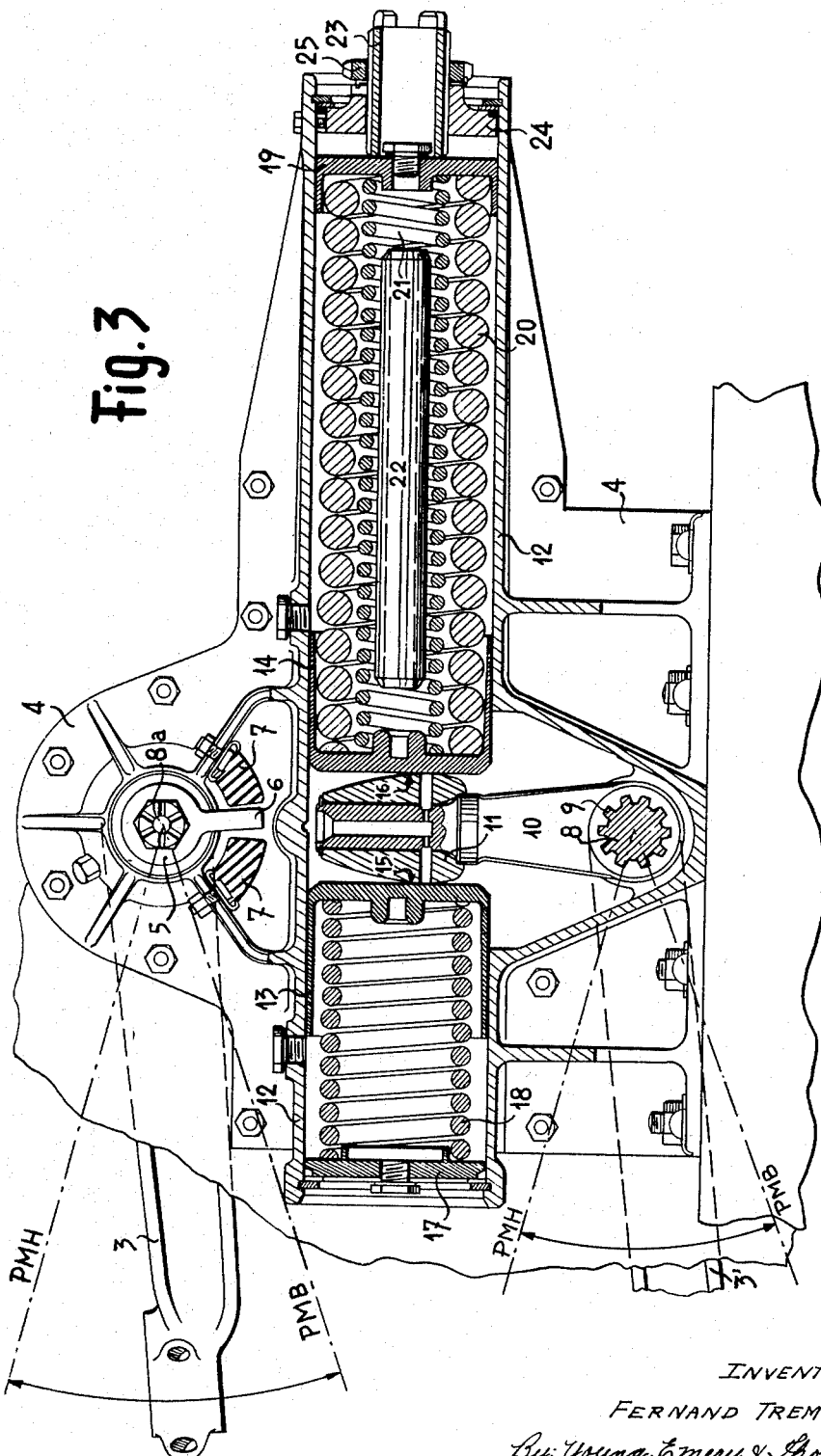

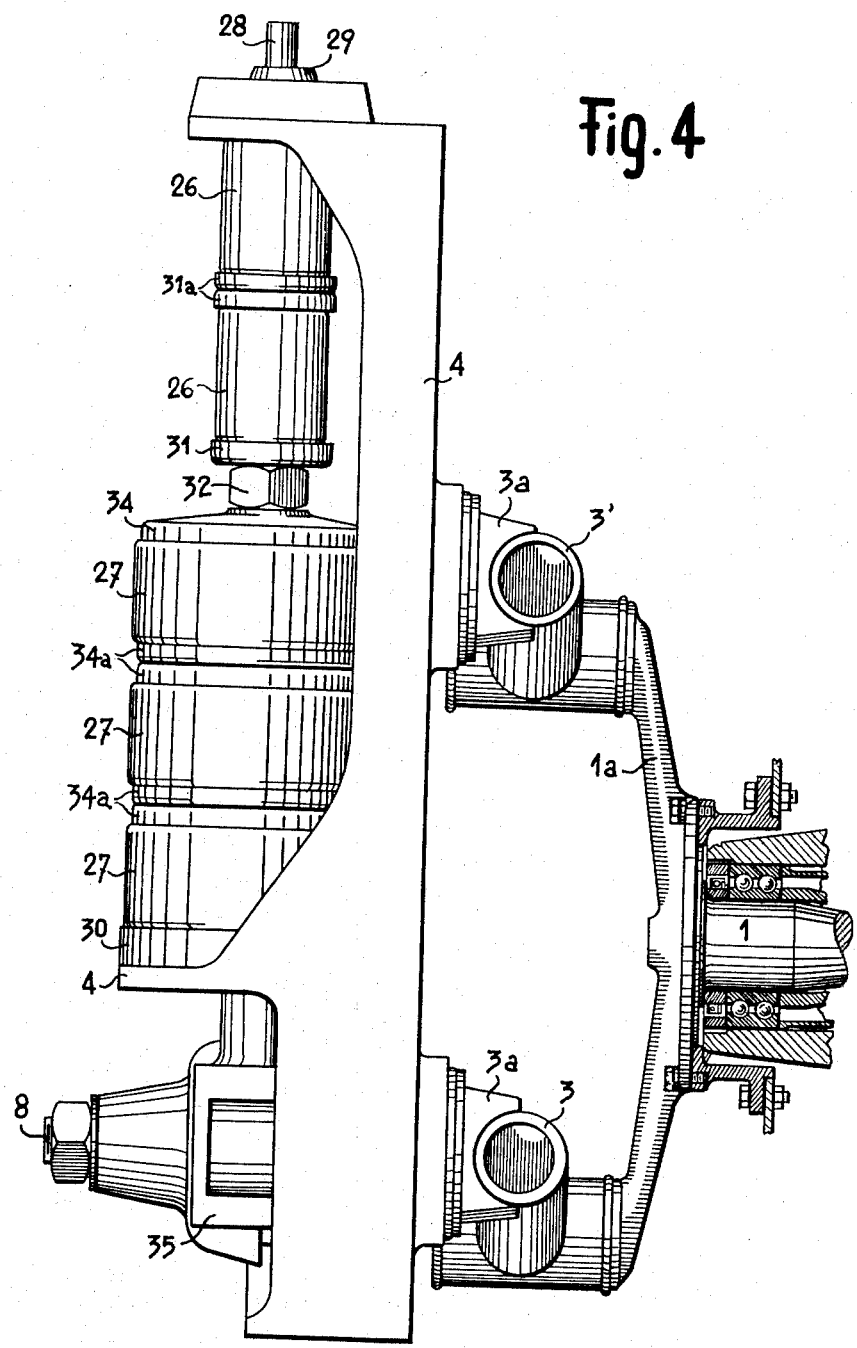

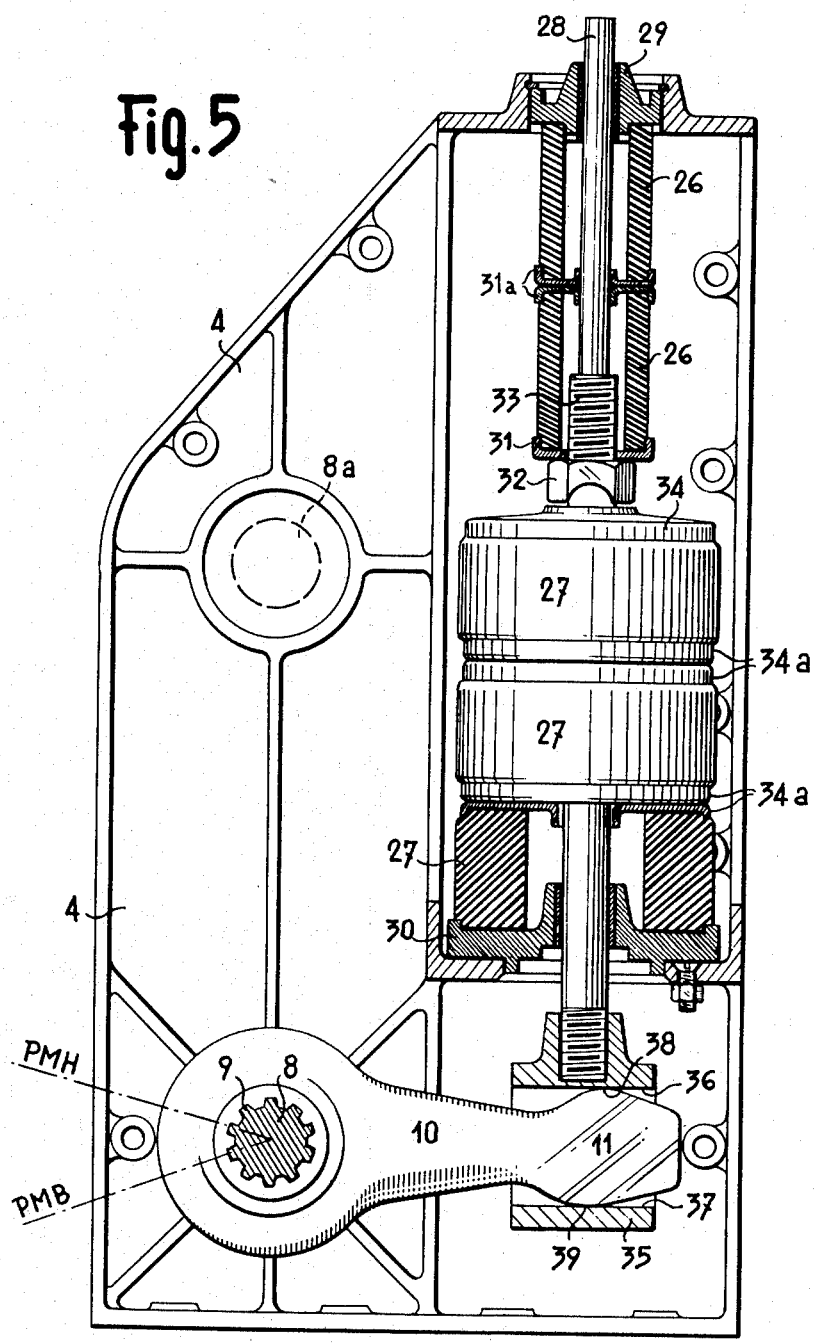

Nov. 22, 1955  F. TREMBLEY  2,724,587
SUSPENSION DEVICE OF VARIABLE FLEXIBILITY FOR VEHICLES
Filed Jan. 24, 1950  7 Sheets—Sheet 6
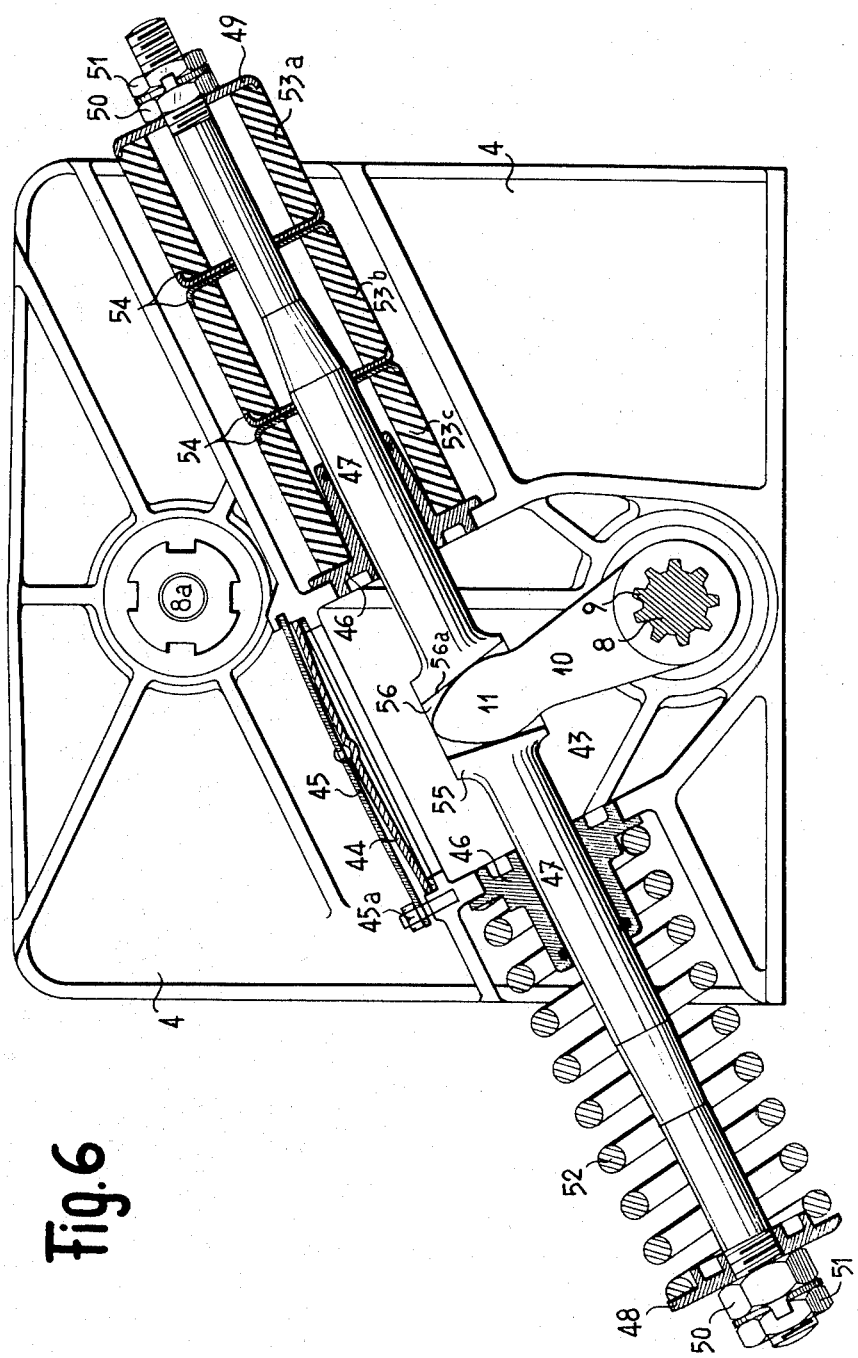
INVENTOR:
FERNAND TREMBLEY
By: Young, Emery & Thompson
Attys.

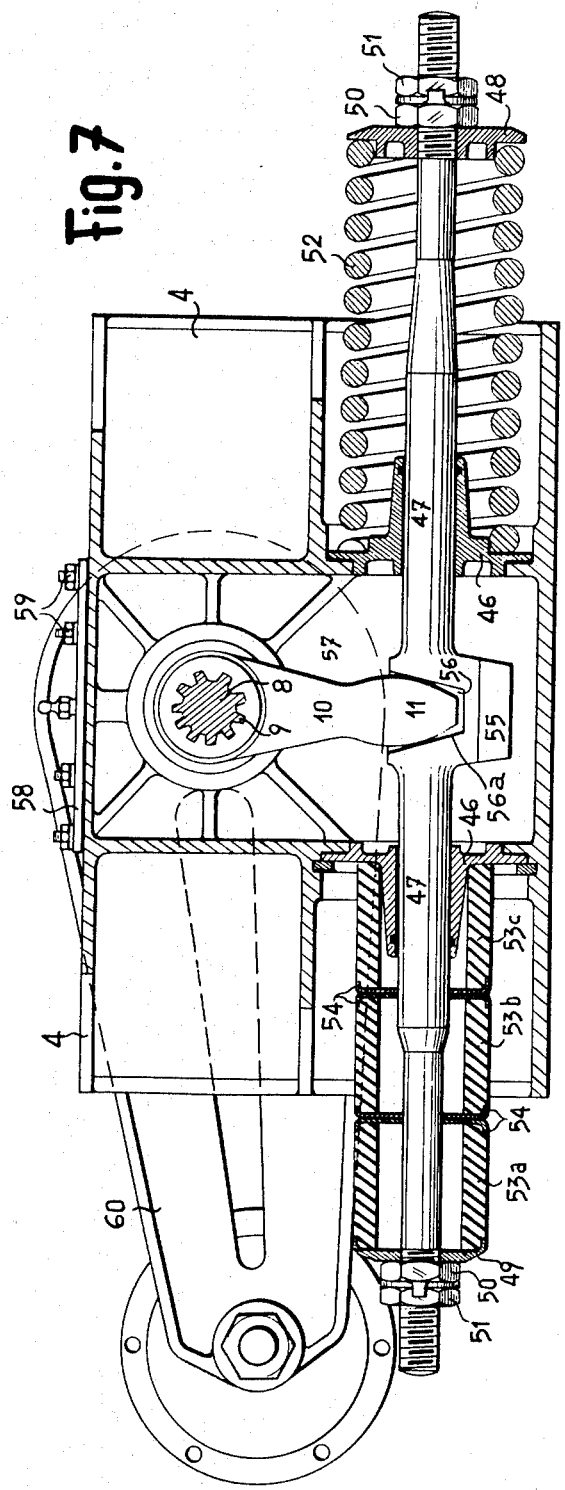

United States Patent Office 2,724,587
Patented Nov. 22, 1955

2,724,587

SUSPENSION DEVICE OF VARIABLE FLEXIBILITY FOR VEHICLES

Fernand Trembley, Bellerive, Geneva, Switzerland, assignor to Societe de Recherches Techniques et d'Exploitations Industrielles, Geneva, Switzerland, a corporation of Switzerland Application January 24, 1950, Serial No. 140,226

Claims priority, application France March 19, 1949

3 Claims. (Cl. 267—15)

The present invention has for its subject a suspension device of variable flexibility for automobile and analogous vehicles, which device is constituted by a lever arm secured to one or more arms carrying the shaft of a wheel and provided at its end with a cam having substantially the shape of a gear tooth acting on a member connected to the resilient suspension members.

The connecting member of the resilient suspension members has at least one straight line generating surface, adapted to co-operate with the cam having a gear shape, said cam bearing against the said surface at a distance from its axis of rotation which is the greater the more the lever is spaced from its position of equilibrium. A return force is thus obtained which is the greater the further the wheel is removed from its normal position.

Another object of the invention is to provide that the axis of the cam lever is carried by a casing to which are hinged two arms of which one is secured to an auxiliary arm turning in the framework of the device and the other being secured to the shaft carrying the arm provided with the cam. The auxiliary shaft may carry a lever co-operating on opposite sides of its position of equilibrium with shock absorbing members, such as helical springs or pieces of rubber.

Some forms of construction of the subject of the invention are shown by way of example with reference to the accompanying drawings, wherein:

Fig. 2 is a section on the line II—II of Fig. 1.

Fig. 3 is a section on the line III—III of Fig. 2.

Fig. 4 is an elevation of a first form of construction of the rear suspension.

Fig. 5 is a vertical section of the device of Fig. 4.

Fig. 6 is an axial section of a second form of construction of the suspension of a front wheel.

Fig. 7 is a similar view of a second form of construction of the suspension of a rear wheel.

Figure 1:
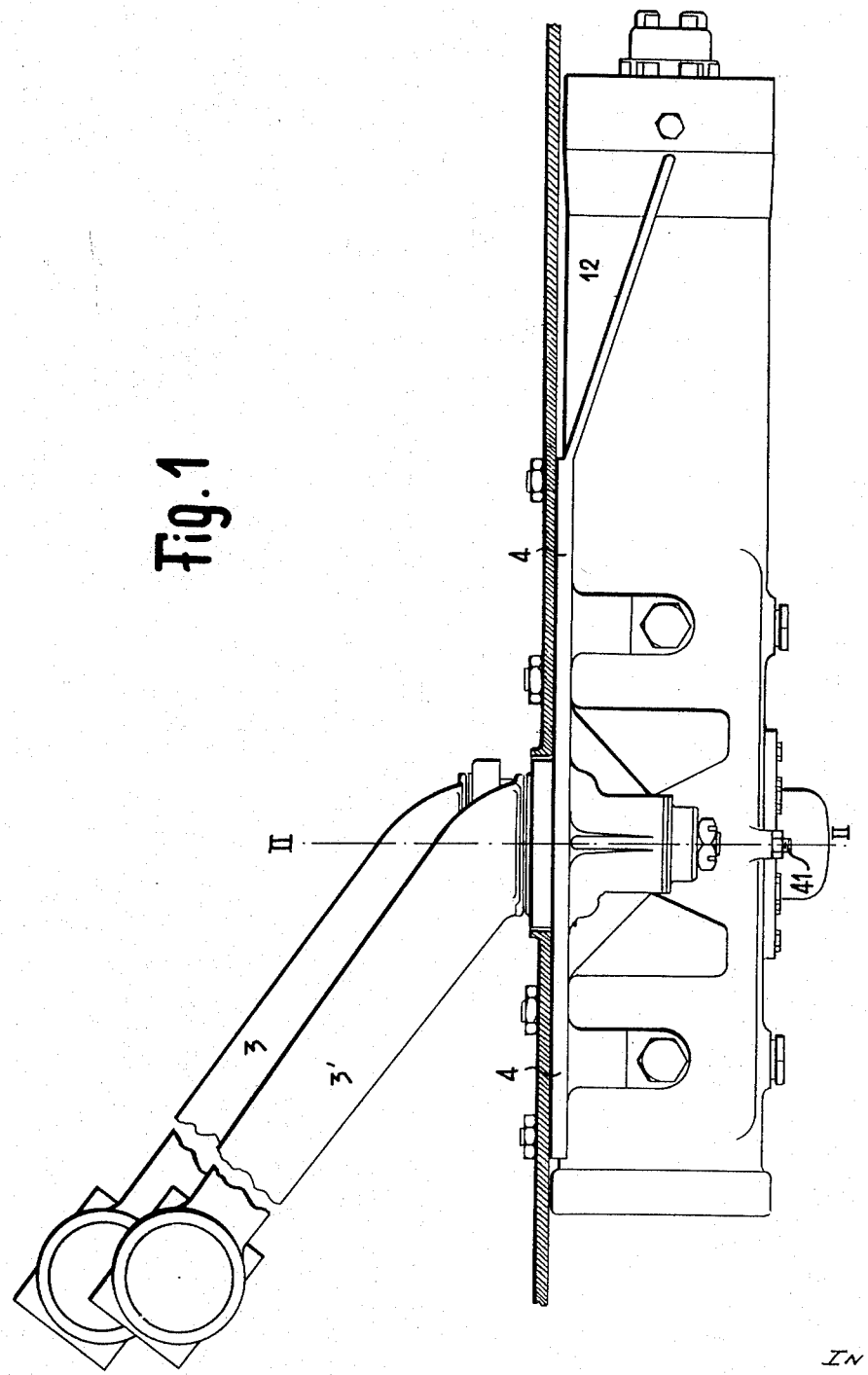
Fig. 1 is a view from above of the suspension device of the front wheel, of a first form of construction (the connection with the hub of the wheel is not shown).

In the present description the term shaft of a wheel implies the driving shaft carrying the wheel hub, in the case of a driving wheel and the stub shaft of the wheel in the case of a non-driving wheel.

With reference to Figs. 1 to 3, the shaft 1 of the front driving wheel, that is to say the driving shaft secured to the fork of a universal joint, is mounted in a casing 1a, provided with two spherical cups 2 hinged to suspension arms 3 and 3'. The upper arm 3' is mounted for rotation in the casing 4 of the shock absorber device by an auxiliary shaft 8a, of which the end is channelled, carries a bent part 5 for forming the finger 6 placed between the two masses of rubber 7, forming stops, which bear against the casing 4.

The lower arm 3 is also mounted for rotation in the casing 4, the end of its shaft 8 is splined at 9 and on this splined end is mounted a lever arm 10 which carries at its end the cam 11; this cam, in longitudinal section parallel to the central vertical plane of the vehicle, has substantially the shape of a gear tooth. The cam is located in the interior of the cylinder 12 secured to the casing 4 of the shock absorbing device. Into the cylinder 12 are placed two pistons 13 and 14 of which the end faces bear at 15 and 16 against the cam 11. Between the piston 13 and the corresponding base 17 of the cylinder 12 is placed a compression spring 18. Between the piston 14 and the corresponding movable bottom 19 of the cylinder 12 are placed two co-axial compression springs 20 and 21.

The cylinder 12 contains lubricant and its two parts containing the springs 20 and 21 on the one hand and 18 on the other hand, are placed into communication by a passage 40, provided in its wall (Fig. 2). This passage ensures a constant volume between the two parts of the cylinder and is provided with an adjusting needle 41.

Into the interior of the spring 21 is placed a tubular piece 22 for example of wood. This piece is adapted to hold the spring 21 in the correct position relatively to the spring 20.

The movable bottom 19 of the cylinder 12 corresponding with the piston 14 bears against a screwed tube 23 cooperating with a screwed portion of the stationary bottom 24 of the said cylinder 12, the whole being locked by the lock-nut 25.

The whole of the suspension device described, with the exception of the carrying arms 3, 3', is located in the interior of the shell of the vehicle, and is thus protected from dust. The casing 4 is bolted to this shell.

The suspension device thus constructed operates in the following manner:

When the wheel rises an accompanying damping is obtained by the compression of one of the masses of rubber 7 with which comes into contact the finger 6 actuated by the upper arm. The principal damping is obtained by the lower arm.

The latter, by rising towards the maximum upper position, shown by chain-dotted lines in Fig. 3 (line PMH), causes the lever 10 to move in a clockwise direction. The point of contact 16 moves along the profile of the cam towards the extreme part of this whilst compressing the springs 20 and 21. The opposing lever arm formed by 10 thus increases in proportion as the axis of the stub shaft rises and moves away from the normal position.

It is possible to adjust the duration and the stroke of the suspension by screwing the screwed tube 23 in or out, which causes the movable bottom 19 to advance towards or recede from the cylinder 12.

When the shaft of the wheel moves downwards, the arm 3 moves towards its maximum lower position indicated by chain-dotted lines in Fig. 3 (line PMB). The lever arm 10, secured to the arm 3, turns in a counterclockwise direction and compresses the spring 18; the point of contact 15 between the piston 13 and the cam 11 moves towards the end of the latter thus increasing the length of the lever arm of the opposing couple.

In the suspension device for the rear wheels (Figs. 4 and 5) the stub shaft 1 is supported by an upper arm 3' mounted for rotation in the bracket 4 of the shock absorbing device and a lower arm 3 mounted for rotation by a shaft 8 in the bracket 4 of the shock absorbing device, the end 9 of said shaft being provided with longitudinal splines. On the end 9 of the shaft is mounted a lever arm 10 carrying a cam 11. The ends of the arms 3 and 3' are secured for example by welding, to a part 3a of the end of the shafts to which they are connected.

The shock absorbing device proper is formed by blocks of rubber 26 and 27 acting under compression. The smaller blocks 26 form shock absorbers for the downward movement of the axis of the stub shaft and the larger blocks for the upward movement of the said stub shaft.

The blocks 26 and 27 are threaded on a vertical shaft 28 sliding freely in the bushes 29 and 30 secured to the casing 4 of the shock absorbing device. The blocks 26 located at the upper end bear at one end against the inner face of the bush 29 and at the other end against a washer 31 itself abutting against an adjusting nut 32 co-operating with a screwed part 33 of the rod 28. Between the two blocks 26 are located centering and guiding washers 31a. The blocks 27 bear at one end against a washer 34 bearing against the same nut 32 and at the other end, by means of an abutment 30, on the bracket 4 of the shock absorbing device. The blocks 27 are separated from one another by centering washers 34a on the rod 28. The screwed rod 28 is provided at its lower portion with a sleeve 35 into which penetrates the cam 11 secured to the lever arm 10 which itself is keyed to the splined part 9 of the shaft 8 by which it is connected to the lever arm 3 which supports the stub shaft. The cam 11 bears against two horizontal faces 36 and 37 of the sleeve 35 at the points 38 and 39 respectively.

The profile of the cam 11 is such that when the axis of the shaft moves away from the normal position, the points 38 or 39 move away from the axis of rotation of the lever arm 10 thus modifying the length of the said lever arm, which forms the suspension of variable flexibility in the ascending direction of the wheel.

The device above described operates in the following manner: when the axis of the stub shaft rises, the rotation of the arm 3 in its ascending direction, causes the rotation of the lever arm 10 in a clockwise direction (Fig. 5), the rod 28, moved by the cam 11, descends whilst compressing the rubber blocks 27. By reason of the profile of the cam, the length of the lever arm increases in proportion as the axis of the stub shaft moves away from the normal position whereby the value of the opposing couple increases. When the axis of the stub shaft descends, the arm 3 moves downwards causing the lever arm 10 to rotate in a counterclockwise direction (Fig. 5) and the rod 28 rises whilst compressing the blocks 26. The lever arm increases in proportion to the movement of the stub shaft its normal position by reason of the movement of the point of contact 38 of the cam 11 on the surface 36 of the sleeve 35. It is this arrangement which provides a suspension of variable flexibility during the downward movements of the wheel.

The construction of the suspension devices described, for the front and rear wheels of a vehicle may be simplified in the manner shown in Figs. 6 and 7. In these figures, the same references indicate corresponding parts of the forms of construction above described.

With reference to Fig. 6, the shaft 8 carries on its splined part 9 an arm 10 at the end of which is located the cam 11.

The arm 10 with the cam 11 are located in a seating 43 of the bracket 4 of the device, the seating being closed in a fluidtight manner by a cover 44 forced against a joint by a transverse member 45 subjected to the action of a nut 45a. In the two opposite faces of the seating 43 opposite the cam 11 are provided circular openings, into which fit movable bearings 46 for a sliding rod 47 screwthreaded at its two ends and carrying on each thereof a washer 48 and 49, respectively, which are adjustable in position by means of nuts 50 and lock nuts 51.

The washer 48 serves as a seat for a spring 52 of which the other end bears against a bearing 46. The washer 49 serves as a seat for a block of rubber 53a forming part of a series of three 53a, 53b, 53c which are located on the part of the rod 47 opposite to that carrying the spring 52. The block 53c bears against a bearing 46. The three blocks of rubber are separated from one another by centering washers 54.

In its central part, located in the seating 43, the rod 47 is provided with a strengthened portion 55 provided with an opening 56 serving as a seating for the cam 11. As shown, the two faces of the seating 56 which are in contact with the cam 11 have a straight generating line and are inclined symmetrically relatively to the central plane of this seating, perpendicular to the axis of the rod 47.

It will be understood that the bearings 46 are forced in a fluidtight manner against the walls of the seating 43 by the pressure of the spring 52 and the rubber blocks 53a, 53b, 53c respectively, so that the lubricant contained in the seating cannot escape.

Instead of being arranged horizontally, as in the first form of construction, the device described above is inclined relatively to the horizontal. The operation, in principle, is the same as that described with reference to the first form of construction, and the angle formed by the rod 47 may be selected at will. Similarly the lever 10 may be keyed to the shaft 8a.

It will be understood that the blocks of rubber 53a, 53b, 53c may be replaced by one or more springs. Further instead of a single spring 52 a number thereof may be provided.

Fig. 7 shows a similar device applied to the suspension of a rear wheel.

The assembly consisting of the shaft 8, the arm 10 with the cam 11, the rod 47 with the spring 52 and the rubber blocks 53a, 53b, 53c is substantially the same as that described with reference to Fig. 6. The arm 10 and the cam 11 are located in a seating 57 of the bracket 4 of the device. The seating is closed in a fluidtight manner by a cover 58 tightened in position by bolts 59.

The shaft 8 is in this case actuated by a single arm 60 carrying the shaft of the stub shaft 61.

The operation is in principle the same as that described with reference to Figs. 4 and 5. However, as the cam 11 operates practically only by its face which bears against the wall 56a of the seating 56 by the action of the spring 52, its opposite face, as also the corresponding wall of the seating may be omitted.

In this form of construction, the device is placed horizontally and may be carried at under all useful angles.

In the two forms of construction shown in Figs. 6 and 7, the suspension is ensured by the compression of the spring 52, adjustable in tension, the rubber blocks 53a, 53b, 53c constituting a shock absorber device.

The forms of construction described above permit of attaining, by simpler mechanical means and consequently less expensively, the same results as with the forms of construction first described.

In these two examples, the seating of the cam 11 may have parallel walls instead of them being inclined relatively to its central plane.

I claim:

1. A suspension device for automobiles and similar vehicles, the flexibility of which varies automatically according to the load on the vehicle and the shocks to which its wheels are subjected, comprising a shaft mounted for rocking movement about its axis on the vehicle, an arm fixed at one end to the shaft, a wheel axle carried by the other end of said arm, a lever fixed at one end to said shaft, a casing surrounding said shaft and fixed on the vehicle, said casing having a compartment for said lever, rod bearings disposed in opposite walls of the compartment on each side of said lever, a rod mounted in said bearings for axial reciprocal movement, resilient means interposed between the rod and the vehicle for resiliently opposing axial movement of the rod in either direction from a point of equilibrium, an actuating member carried by the intermediate portion of said rod and provided with a pair of spaced apart opposed surfaces, and a cam carried by the other end of said lever, said cam having a convexly curved flank on opposite sides thereof and positioned between the opposed surfaces of said rod-actuating member with the opposite flanks of the cam in engagement with the corresponding opposed surfaces of the actuating member, said cam and cooperating surfaces of the rod-actuating member being so positioned that upon movement of the lever from its position of equilibrium in either direction, the line of contact between the flank of the cam and its corresponding cooperating surface of the rod-actuating member will shift to increase the effective length of said lever arm.

2. A suspension device for automobiles and similar vehicles, the flexibility of which varies automatically according to the load on the vehicle and the shocks to which its wheels are subjected, comprising a shaft mounted for rocking movement about its axis on the vehicle, an arm fixed at one end to the shaft, a wheel axle carried by the other end of said arm, a lever fixed at one end to said shaft, a casing surrounding said shaft and fixed on the vehicle, said casing having a compartment for said lever, rod bearings disposed in opposite walls of the compartment on each side of said lever, a rod mounted in said bearings for axial reciprocal movement, axial adjustable abutment means on each end of said rod, resilient means surrounding the rod and interposed between each abutment means and the corresponding rod bearing for resiliently opposing axial movement of the rod in either direction from a point of equilibrium, an actuating member carried by the intermediate portion of said rod and provided with a pair of spaced apart opposed surfaces, and a cam carried by the other end of said lever, said cam having a convexly curved flank on opposite sides thereof and positioned between the opposed surfaces of said rod-actuating member with the opposite flanks of the cam in engagement with the corresponding opposed surfaces of the actuating member, said cam and cooperating surfaces of the rod-actuating member being so positioned that upon movement of the lever from its position of equilibrium in either direction, the line of contact between the flank of the cam and its corresponding cooperating surface of the rod-actuating member will shift to increase the effective length of said lever arm.

3. A suspension device according to claim 1 in which the cam engaging surfaces of the rod-actuating member are symmetrically inclined with respect to the axis of the rod and lie in planes which intersect each other on the side of the rod opposite the shaft.

References Cited in the file of this patent

UNITED STATES PATENTS

| | | |
|---|---|---|
| Re. 18,885 | Dubonnet | July 4, 1933 |
| 1,641,472 | Brown | Sept. 6, 1927 |
| 1,941,879 | Dubonnet | Jan. 2, 1934 |
| 2,100,689 | Dubonnet | Nov. 30, 1937 |
| 2,139,592 | Kirkby | Dec. 6, 1938 |

FOREIGN PATENTS

| | | |
|---|---|---|
| 38,961 | France | May 19, 1931 |
| | (1st addition to No. 695,060) | |
| 199,172 | Great Britain | June 21, 1923 |
| 344,557 | Great Britain | Mar. 12, 1931 |

OTHER REFERENCES

"Elements of Mechanism" by Schwamb, Merrill and James, third edition 1921, John Wiley & Sons, Inc., New York, page 116.